United States Patent
Yu et al.

(10) Patent No.: US 8,269,411 B2
(45) Date of Patent: Sep. 18, 2012

(54) DISPLAY DEVICE WITH QUANTUM DOT PHOSPHOR AND MANUFACTURING METHOD THEREOF

(75) Inventors: Yi-Cheng Yu, Hsin-Chu (TW); Chih-Lin Wang, Hsin-Chu (TW); Ru-Shi Liu, Hsin-Chu (TW); Chun-Che Lin, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 106 days.

(21) Appl. No.: 12/899,841

(22) Filed: Oct. 7, 2010

(65) Prior Publication Data
US 2011/0156575 A1    Jun. 30, 2011

(30) Foreign Application Priority Data

Dec. 30, 2009  (TW) .............................. 98145977 A

(51) Int. Cl.
*H01L 33/50* (2010.01)
*H01L 33/48* (2010.01)

(52) U.S. Cl. ........ 313/501; 313/499; 313/110; 313/112; 257/98; 445/24

(58) Field of Classification Search .......... 313/498–512, 313/110–112, 483–487; 445/24, 25; 257/98–100
See application file for complete search history.

(56) References Cited

U.S. PATENT DOCUMENTS

| | | | |
|---|---|---|---|
| 6,501,091 B1 | 12/2002 | Bawendi et al. | |
| 7,264,527 B2 | 9/2007 | Bawendi et al. | |
| 7,265,488 B2 * | 9/2007 | Ng et al. | 313/501 |
| 7,324,080 B1 * | 1/2008 | Hu et al. | 345/102 |
| 7,789,527 B2 | 9/2010 | Matsumoto et al. | |
| 2003/0063062 A1 * | 4/2003 | Tsumura et al. | 345/102 |
| 2005/0230693 A1 | 10/2005 | Chen | |
| 2008/0036943 A1 * | 2/2008 | Matsumoto et al. | 349/68 |
| 2008/0100551 A1 * | 5/2008 | Haga et al. | 345/88 |
| 2011/0102704 A1 * | 5/2011 | Dunn et al. | 349/61 |

FOREIGN PATENT DOCUMENTS

| | | | |
|---|---|---|---|
| CN | 1954250 | | 4/2007 |
| JP | 2002023159 A | * | 1/2002 |
| JP | 2003315529 A | * | 11/2003 |
| TW | I243489 | | 11/2005 |
| TW | I291251 | | 12/2007 |
| WO | WO 2011024882 A1 | * | 3/2011 |

OTHER PUBLICATIONS

China Office Action dated Mar. 14, 2011.

* cited by examiner

*Primary Examiner* — Mariceli Santiago
(74) *Attorney, Agent, or Firm* — Thomas, Kayden, Horstemeyer & Risley, LLP

(57) ABSTRACT

A display device and a method of manufacturing the same are provided. The display device includes an illuminate unit and a color filter. The illuminate unit has a light-emitting chip and a plurality of quantum dot phosphors for generating a color light which has an optical spectrum including the first blue peak wavelength, a first green peak wavelength, and a first red peak wavelength. The color filter is disposed in the light path of the color light, wherein the color filter has a transmittance spectrum having a second blue peak wavelength, a second green peak wavelength, and a second red peak wavelength. The first blue peak wavelength, the first green peak wavelength, and the first red peak wavelength respectively match the second blue peak wavelength, the second green peak wavelength, and the second red peak wavelength in order to enhance the color performance of the display device.

21 Claims, 6 Drawing Sheets

DISPLAY DEVICE WITH QUANTUM DOT PHOSPHOR AND MANUFACTURING METHOD THEREOF

BACKGROUND OF THE INVENTION

1. Field of the Invention

The present invention generally relates to a display device and a manufacture method thereof. Particularly, the present invention relates to a display device using quantum dot phosphor and a manufacture method thereof.

2. Description of the Prior Art

The Liquid Crystal Display (LCD) device is mainly composed of a liquid crystal panel and a backlight module. The liquid crystal does not illuminate, therefore it needs a backlight module to generate light, which is controlled by the molecules of the liquid crystal of the liquid crystal panel to produce images. For good color performance of the generated images, the collocation of the light generated by the backlight module and the color filter at the front side of the liquid crystal panel has become an important research topic.

The light sources extensively used in a backlight module in the industrial circle are mainly cold cathode fluorescent lamp (CCFL) and light emitting diode (LED). The phosphors generally used in CCFL are $BAM:Eu^{2+}$, $LaPO_4:Ce, Tb$, $Y_2O_3:Eu^{3+}$, wherein the red light and the green light are a part of the linear spectrum. The spectrum has virtues of narrow full width at half maximum and high color saturation. However the phosphors cannot be excited by blue light and cannot be used in white LED using blue exciting light. Therefore, the light generated by CCFL has high color saturation, and color performance of CCFL is usually better than that of the general white LED. When LED is used as a light source, because conventional phosphor have a greater full width at half maximum (FWHM), the color saturation will be lower and the color of images often is not satisfying.

FIG. 1 shows an optical spectrum of a LED using conventional phosphors and a corresponding transmittance spectrum of a color filter. The optical spectrum generally includes a blue peak 11, a green peak 13, and a red peak 15; the transmittance spectrum of the color filter respectively has a blue peak of blue color resist portion 21, a green peak of green color resist portion 23, and a read peak of red color resist portion 25. As FIG. 1 shows, the blue peak 11, the green peak 13, the red peak 15 and their corresponding blue peak of blue color resist portion 21, green peak of green color resist portion 23, and read peak of red color resist portion 25 are somewhat mismatched, therefore the color purity is not good. Besides, the waveforms of green peak 13 and red peak 15 are wider and not distinct so that the green peak 13 and the red peak 15 respectively overlap with uncorresponding color resists. Therefore, a light corresponding to the green peak 13 may pass through the blue color resist or the red color resist, which further results in color impurity. Similarly, a light corresponding to the red peak 15 may also pass through the green color resist, affecting the light purity.

SUMMARY OF THE INVENTION

It is an object of the present invention to provide a display device with better color performance.

It is another object of the present invention to provide a display device with greater brightness.

It is another object of the present invention to provide a display device and a manufacture method thereof to provide a display device with better color performance.

The display device of the present invention includes an illumination unit and a color filter. The illumination unit includes a light-emitting chip and a plurality of quantum dot phosphors, wherein the light-emitting chip emits light to excite the quantum dot phosphors to generate a color light. The color light has an optical spectrum having a first blue peak, a first green peak, and a first red peak, and at each peak value each peak has a respective wavelength, including a first blue peak wavelength, a first green peak wavelength, and a first red peak wavelength.

The color filter is disposed in a light path of the illumination unit to filter the color light generated by the illumination module. A transmittance spectrum of the color filter has a second blue peak, a second green peak, and a second red peak, and at each peak value each peak has a respective wavelength, including a second blue peak wavelength, a second green peak wavelength, and a second red peak wavelength. The first blue peak wavelength, the first green peak wavelength, and the first red peak wavelength respectively match with the second blue peak wavelength, the second green peak wavelength, and the second red peak wavelength to elevate the color performance of the display device.

A manufacturing method of a display device includes: providing a color filter having a plurality of color resists, wherein a transmittance spectrum of the color filter has a second blue peak, a second green peak, and a second red peak, and at each value each peak has a respective wavelength, including a second blue peak wavelength, a second green peak wavelength, and a second red peak wavelength; and providing an illumination unit having a light-emitting chip and a plurality of quantum dot phosphors, wherein the light-emitting chip emits light to excite the quantum dot phosphors to generate a color light. The color light has an optical spectrum having a first blue peak, a first green peak, and a first red peak, and at each peak value each peak has a respective wavelength, including a first blue peak wavelength, a first green peak wavelength, and a first red peak wavelength.

The method further includes a step of adjusting the optical spectrum of the color light or the transmittance spectrum of the color filter in a manner that a ratio of the first blue peak wavelength to the second blue peak wavelength is between 0.95 and 1.05, a ratio of the first green peak wavelength to the second green peak wavelength is between 0.95 and 1.05, and a ratio of the first red peak wavelength to the second red peak wavelength is between 0.82 and 1.21.

DETAILED DESCRIPTION OF THE PREFERRED EMBODIMENT

The present invention provides a display device and a manufacturing method thereof. In a preferred embodiment, the display device of the present invention is disposed within a display device to provide a light source for image generation. A display device preferably includes a liquid crystal display (LCD), such as a home LCD TV, LCD monitors for PC and laptop computer, and liquid crystal display panels of mobile phone and digital camera.

Figure 1:
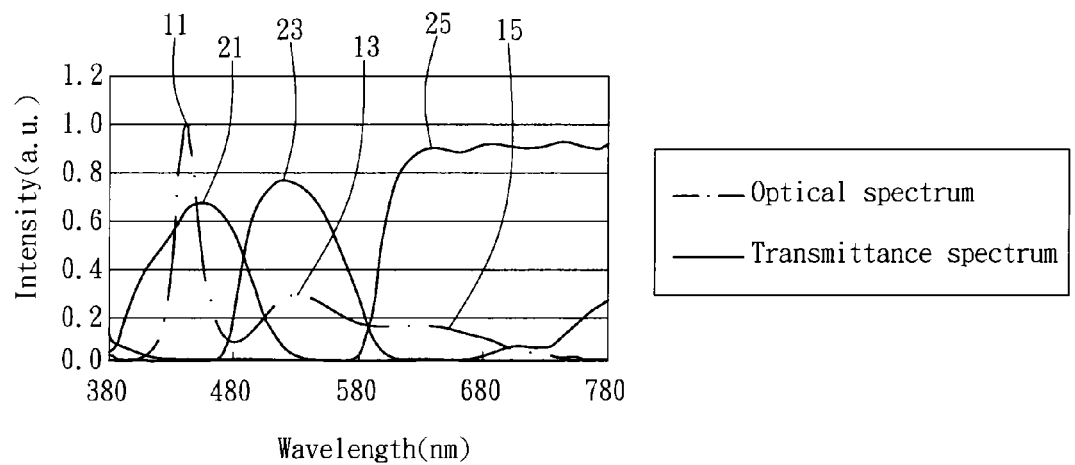
FIG. 1 is a diagram of the optical spectrum of the LED using conventional phosphors and the corresponding transmittance spectrum of the color filter.
Figure 2:
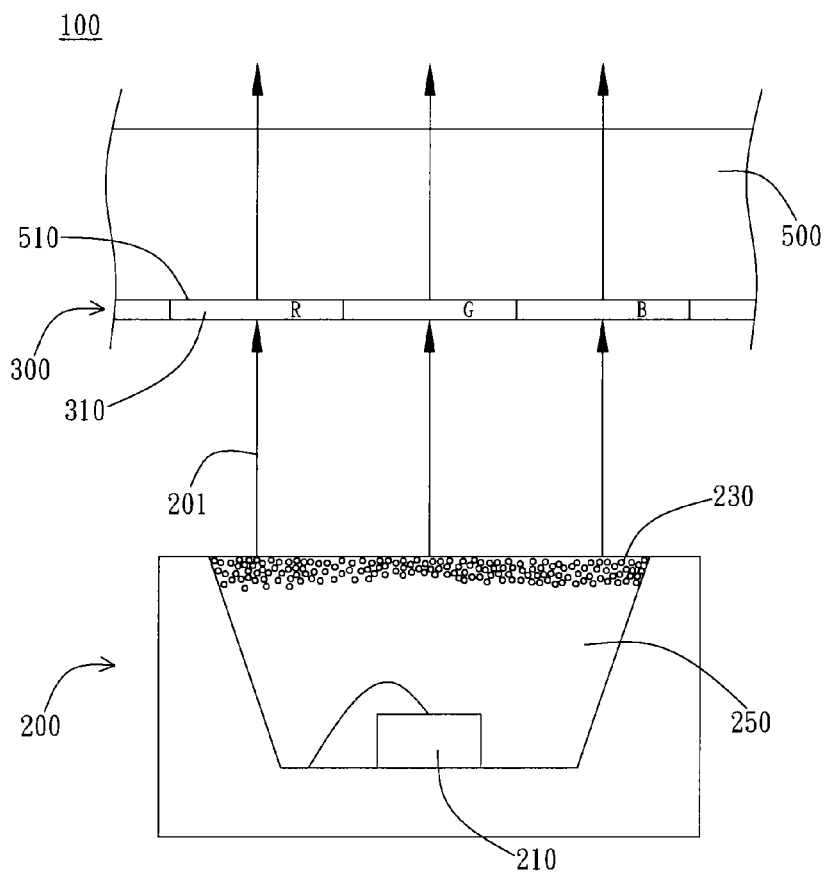
FIG. 2 is a schematic view of the embodiment of the display device of the present invention.

As FIG. 2 shows, a display device 100 includes an illumination unit 200 and a color filter 300. The color filter is disposed in a light path of the illumination unit, for filtering a color light generated by the illumination unit 200. The color filter 300 is preferably disposed on the side (or the opposite side) of an incident plane 510 of the display panel to filter the light entering the display panel 500, which can be LCD or other planar display panels. In the embodiment shown in FIG. 2, the illumination unit 200 is a light-emitting diode (LED) of a bottom-lighting or direct-type backlight module. That is, the color filter 300 is disposed over the illumination unit 200, wherein the illumination unit 200 emits light directly toward the color filter 300. In another embodiment, however, the illumination unit 200 can also be collocated with a light guide plate or other optical components of an edge-lighting or edge-type backlight module. Besides, a variety of optical components, such as the brightness enhanced film, the diffuser film, and the diffuser plate can be disposed between the illumination unit 200 and the color filter 300, if necessary.

As FIG. 2 shows, a plurality of color resists 310 are disposed on or within the color filter. The color resists 310 include a blue color resist B, a green color resist G and a red color resist R. Each color resist respectively allows a blue light, a green light, and a red light of a certain wavelength range to pass through and blocks light beyond the range of wavelengths. In other words, the color light 201 is isolated or separated into a blue light, a green light, and a red light of a decided wavelength range by the color resist 310 after passing through the color filter 300.

The illumination unit 200 includes a light-emitting chip 210 and a plurality of quantum dot phosphors 230 therein. The light-emitting chip 210 is preferably an organic light emitting diode (OLED) chip, a light emitting diode (LED) chip, or a blue light-emitting LED chip; however, in another embodiment, it is able to apply different kinds of chips or chips emitting other color lights. The quantum dot phosphor 230 is preferably sealed within the illumination unit 200 and in the upper site of the illumination unit 200. As the preferred embodiment shown in FIG. 2, the quantum dot phosphor 230 is disposed within a sealant 250 in a manner of remote phosphor; namely, an adequate distance exists between the quantum dot phosphor 230 and the light-emitting chip 210, for example: a distance from 200 μm to 300 μm. At this time, the color light 201 generated by the illumination unit 200 has a more desired waveform, which means the optical spectrum of the illumination unit 200 matching the transmittance spectrum of the color filter 300. In other embodiments, the quantum dot phosphor 230 can be disposed within the sealant 250 in the manner of uniform distribution or conformal distribution. The conformal distribution is the manner in which the phosphor and the illumination chip contact each other, namely the phosphor is directly coated on the surface of the chip. And the so-called remote phosphor means the phosphor and the illumination chip do not contact each other in coating, namely, there is a distance from the chip to the phosphor distributed on the chip. The light generated by the illumination 210 can excite the quantum dot phosphor 230, and therefore the illumination unit 210 emits the color light 201. The color light 201 is preferably a mixed white light or other color lights.

Figure 3A:
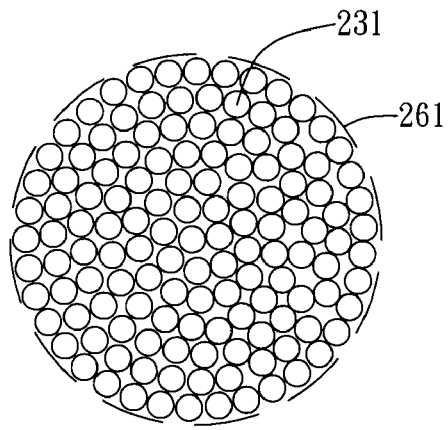
FIG. 3A is a schematic view of the embodiment of the quantum dot phosphor.
Figure 3B:
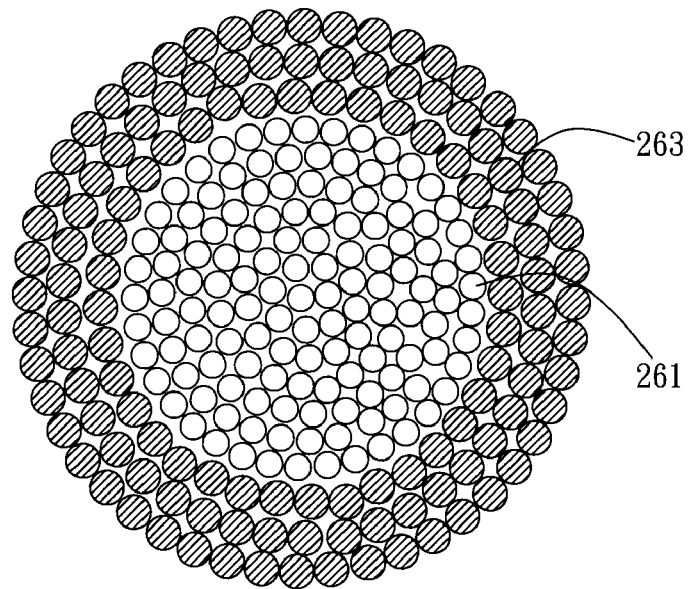
FIG. 3B is a schematic view of another embodiment of the quantum dot phosphor.

A material of the quantum dot phosphor 230 is preferably selected from at least one of the following: ZnS, ZnO, GaN, ZnSe, CdS, ZnTe, GaSe, CdSe, CdTe, GaAs, InP, GaSb, InAs, Te, PbS, InSb, PbTe, or PbSe. As FIG. 3A shows, the quantum dot phosphor 230 can be composed of a single core 261 which has the same material. For example, CdSe consisting of Cd/Se atoms 231 serves as the material of the core 261 to form the quantum dot phosphor 230. Cd/Se atoms 231 has a plurality of Cd atoms and Se atoms. When the material of the single core 261 of the quantum dot phosphor 230 is CdSe, a diameter of the core 261 is preferably between 2.3 nm and 5.5 nm in order to cooperate with the illumination chip 210 and then generate the color light 201 with desired optical spectrum matching the transmittance spectrum of the color filter 300. However, in the embodiment shown in FIG. 3B, the quantum dot phosphor 230 can also be composed of the core 261 and a layer 263 which covers the core. A material of the core 261 is selected from at least one of the following: ZnS, ZnO, GaN, ZnSe, CdS, ZnTe, GaSe, CdSe, CdTe, GaAs, InP, GaSb, InAs, Te, PbS, InSb, PbTe, or PbSe; and a material of the layer 263 is selected from at least one of the following: ZnS, ZnO, GaN, ZnSe, CdS, ZnTe, GaSe, CdSe, CdTe, GaAs, InP, GaSb, InAs, Te, PbS, InSb, PbTe, or PbSe. In a preferred embodiment, when the material of the core 261 of the quantum dot phosphor 230 is CdSe, a diameter of the core 261 is between 2.3 nm and 5.5 nm; when the material of the layer 263 is ZnS, a thickness of the layer is restricted to be between 0.2 nm and 1.7 nm to collocate with the light-emitting chip to generate the color light with desired optical spectrum matching the transmittance spectrum of the color filter 300.

Figure 4:
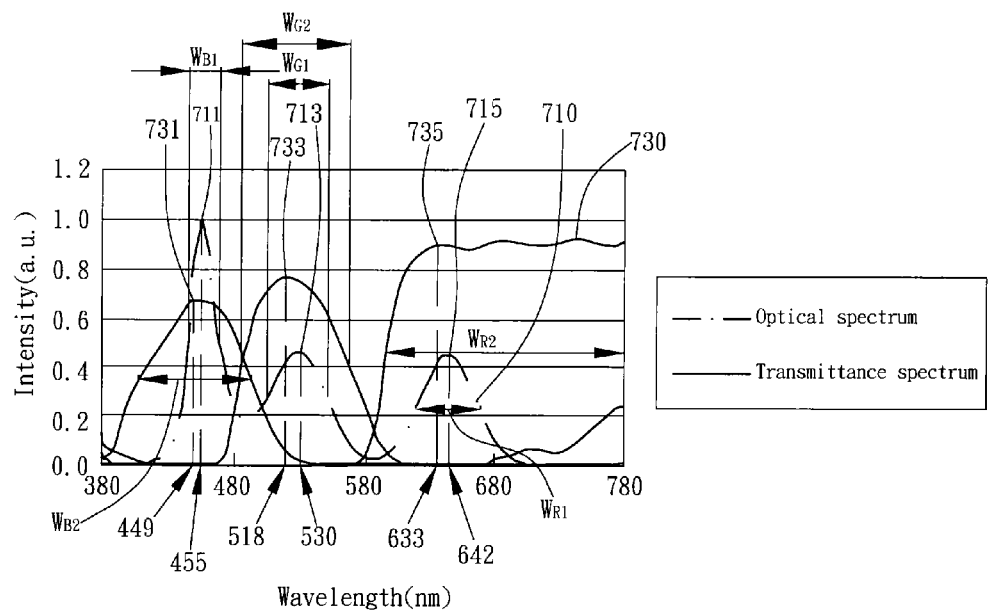
FIG. 4 is a diagram of the embodiment of the optical spectrum of the illumination unit and the corresponding transmittance spectrum of the filter of the present invention.

As FIG. 4 shows, the color light 201 generated by the illumination unit 200 has an optical spectrum 710, and the color filter 300 has a transmittance spectrum 730. The optical spectrum 710 represents a feature of the color light 201 generated by the illumination unit 200, which is the relationship between each range of wavelength and light intensity. The transmittance spectrum 730 represents a penetration proportion of every wavelength passing through the color filter 300. The optical spectrum 710 has a first blue peak 711, a first green peak 713, and a first red peak 715. The first blue peak 711, the first green peak 713, and the first red peak 715, and at each peak value each peak corresponds respectively to a wavelength, including a first blue peak wavelength of 455 nm, a first green peak wavelength of 530 nm, and a first red peak wavelength of 642 nm. The transmittance spectrum 730 having a second blue peak 731, a second green peak 733, and a second red peak 735 correspond respectively to a blue light transmittance color resist B, a green light transmittance color resist G, and a red light transmittance color resist R. At each peak value of the second blue peak 731, the second green peak 733, and the second red peak 735 of the transmittance spectrum 730, each peak corresponds respectively to a wavelength, including a second blue peak wavelength of 449 nm, a second green peak wavelength of 518 nm, and a second red peak wavelength of 633 nm.

As FIG. 4 shows, the first blue peak wavelength of 455 nm matches with the second blue peak wavelength of 449 nm. It means that the wavelengths of both are very close or the same that the first blue peak 711 of the optical spectrum 710, which to a large degree lays over the second blue peak 731 of the transmittance spectrum 730. By design, a higher proportion of the blue light in the color light 201 passes through the color filter 300 with lower aberration. In a preferred embodiment, a ratio of the first blue peak wavelength of 455 nm to the second blue peak wavelength of 449 nm is preferably between 0.96 and 1.04. Similarly, the first green peak wavelength 530 matches with the second green peak wavelength of 518 nm. By design, a higher proportion of the green light in the color light 201 passes through the color filter 300 with lower aberration. In a preferred embodiment, a ratio of the first green peak wavelength of 530 nm to the second green peak wavelength of 518 nm is preferably between 0.95 and 1.05. The wavelengths can be adjusted by the chip and/or the phosphor of the LED; the peaks of transmittance spectrum can be adjusted by the material of the color filter. Because of the differences between materials of the chip, phosphor, and color filter, the matching conditions of different color light differ from one other.

The first red peak wavelength of 642 nm matches with the second red peak wavelength of 633 nm. Because a red waveform might extend to a longer wavelength or become several successive peaks with the highest light intensity, the single red peak is not distinct, therefore the first red peak 715 and the second red peak 735 preferably mean that the optical spectrum 710 or the transmittance spectrum 730 reaches the locally or relatively greatest value or the locally or relatively highest peak at the earliest time. By design, a higher proportion of the red light in the color light 201 passes through the color filter 300 with lower aberration. In a preferred embodiment, a ratio of the first red peak wavelength of 642 nm to the second red peak wavelength of 633 nm is preferably between 0.82 and 1.21.

In a preferred embodiment, the first blue peak wavelength is preferably between 440 nm and 457 nm; the second blue peak wavelength is preferably between 440 nm and 457 nm. The first green peak wavelength is between 510 nm and 535 nm; the second green peak wavelength is between 510 nm and 535 nm. The first red peak wavelength is between 640 nm and 780 nm; the second red peak wavelength is between 640 nm and 780 nm.

Besides, as FIG. 4 shows, in the embodiment, a ratio $W_{G1}/W_{G2}$ of a full width at half maximum $W_{G1}$ of the first green peak 713 to a full width at half maximum $W_{G2}$ of the second green peak 733 is smaller than 0.45. By design, a green waveform in the optical spectrum 710 of the color light 201 is narrower and hardly enters a red or blue color gamut. Therefore the green light in the color light 201 can efficiently pass through the green light transmittance color resist G and form a purer green light; furthermore, the green light in the color light 201 hardly enters the red or blue gamut and then passes through the blue light transmittance color resist B and the red light transmittance color resist R, therefore the purity of the blue light and the red light will not be effected. Generally speaking, by the above design, the overall color saturation will be elevated. Similarly, a ratio of a full width at half maximum $W_{R1}$ of the first red peak 715 to a full width at half maximum $W_{R2}$ of the second red peak 735 is designed to be smaller than 0.25. Consequently, the purity of every separated color light and the overall color saturation will be elevated.

Besides, as FIG. 4 shows, a full width at half maximum $W_{B1}$ of the first blue peak 711, the full width at half maximum $W_{G1}$ of the first red peak 713, and the full width at half maximum $W_{R1}$ of the first red peak 715 are preferably all smaller than 50 nm. In another embodiment, the full width at half maximum of the first green peak 713 and that of the first red peak 715 are preferably between 35 nm and 50 nm. By the above design, the purity of every separated color light and the overall color saturation will be elevated. Besides, because the waveforms of the first green peak 713 and that of the first red peak 715 are slim and tall, the rough between them is a deep valley; in other words, the light between the green and red lights has lower energy. Such energy distribution is helpful in elevating the purity of every separated color light and preventing them from mixing with other color lights.

In the embodiment shown in the table below and FIG. 5, the full width at half maximum of the first green peak 713 is preferably 38 nm, which is only half of a full width at half maximum of 77 nm of the green light region of an LED having conventional phosphor. Similarly, the full width at half maximum of the first red peak 715 is preferably 45 nm, which is less than half of a full width at the maximum of 111 nm of the red light region of an LED having conventional phosphor. Besides, the trough between the first green peak 713 and the first red peak 715 is also deeper and steeper than a trough in the corresponding position in an optical spectrum of an LED having conventional phosphor; in other words, in the embodiment, light between a red light region and a green light region has lower energy.

TABLE 1

A comparison of the optical spectrum of the present embodiment to the optical spectrum of a LED having conventional phosphor.

| Light color | Full width at half maximum (nm) of the optical spectrum of the present embodiment | Full width at half maximum (nm) of the optical spectrum of the a LED having the conventional phosphor |
| --- | --- | --- |
| Green | 38 | 77 |
| Red | 45 | 111 |

Figure 5:
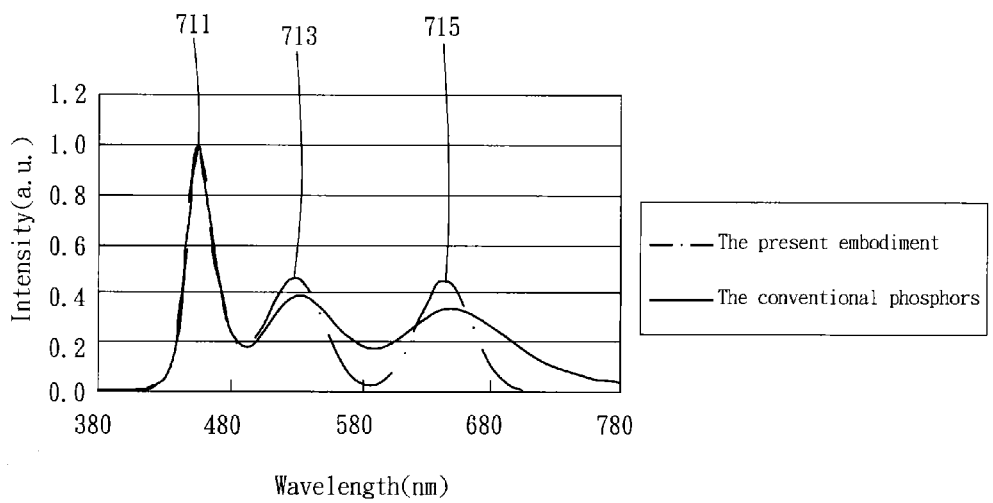
FIG. 5 is a diagram of the comparison of the optical spectrum between the embodiment of the optical spectrum of the illumination unit of the present invention and LED using conventional phosphor.
Figure 6:
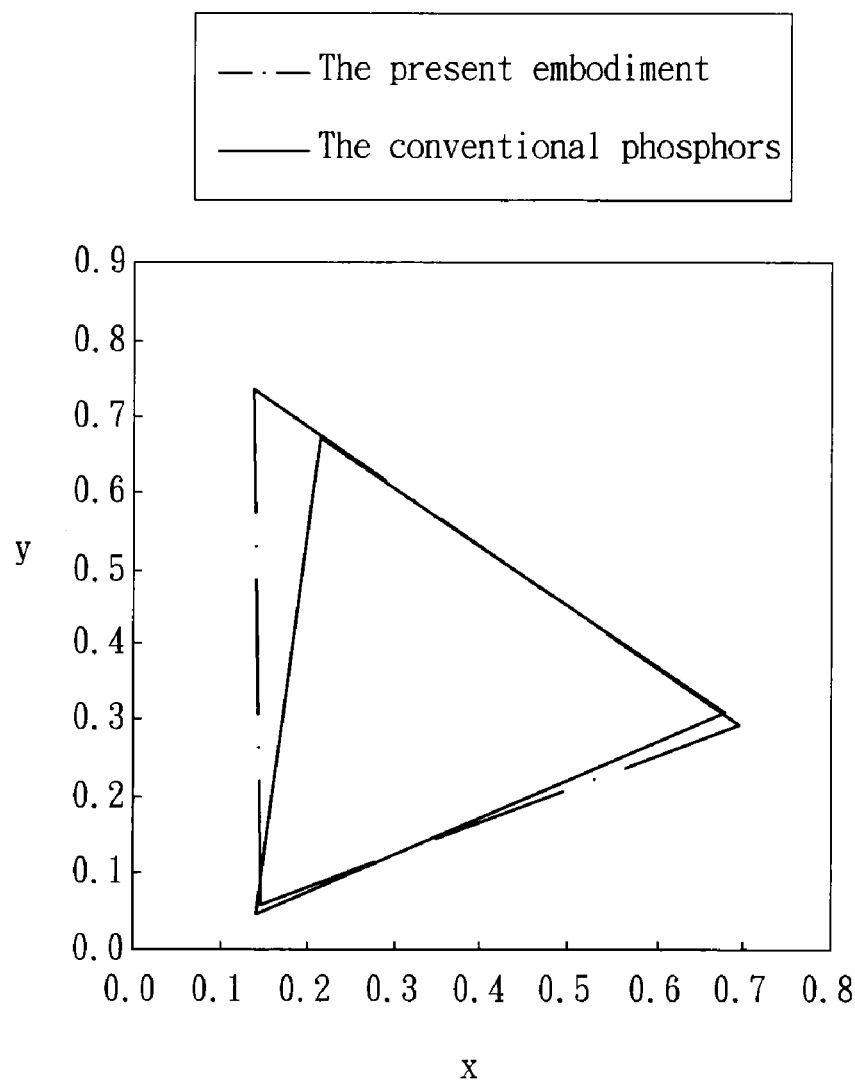
FIG. 6 is a diagram of the comparison of color expression between the embodiment of the optical spectrum of the illumination unit of the present invention and LED using conventional phosphor.

After the two groups of light mentioned in Table 1 and FIG. 5 pass separately through the color filter 300, the result of color performance in the color space will be obtained, as Table 2 and FIG. 6 show. The color space shown in FIG. 6 is presented in an X-Y coordinate system, wherein the position of a color can be presented with the x- and y-coordinate of the color space. As Table 2 and FIG. 6 show, in the present embodiment, after the light passes through the color filter 300, a color saturation of 119.3% of NTSC (National Television System Committee) will be obtained in the color space, while only a color saturation of 99.1% of NTSC is obtained when the light from an LED with conventional phosphor passes through the color filter. Therefore it can be confirmed that when the full width at half maximum $W_{G1}$ of the first green peak 713 and the full width at half maximum $W_{R1}$ are restricted and the energy in the trough is lowered, it will advantage the color saturation of NTSC to increase. Besides, because the color light 201 passes through the color filter 300 more efficiently, a brightness parameter of 26.2 in the present embodiment is greater than a brightness parameter of 22.6 in the conventional embodiment.

TABLE 2

A comparison of a color performance of the
light passing through the color filter in the
present embodiment to a light passing through the color
filter in the embodiment having conventional phosphor.

| | NTSC | Brightness | Coordinate of Red light | Coordinate of Green light | Coordinate of Blue light |
|---|---|---|---|---|---|
| The present embodiment | 119.3% | 26.2 | (0.6965, 0.2936) | (0.1379, 0.7403) | (0.1477, 0.0566) |
| The LED having conventional phosphor | 99.1 | 22.6 | (0.6780, 0.3109) | (0.2137, 0.6748) | (0.1465, 0.0525) |

Figure 7:
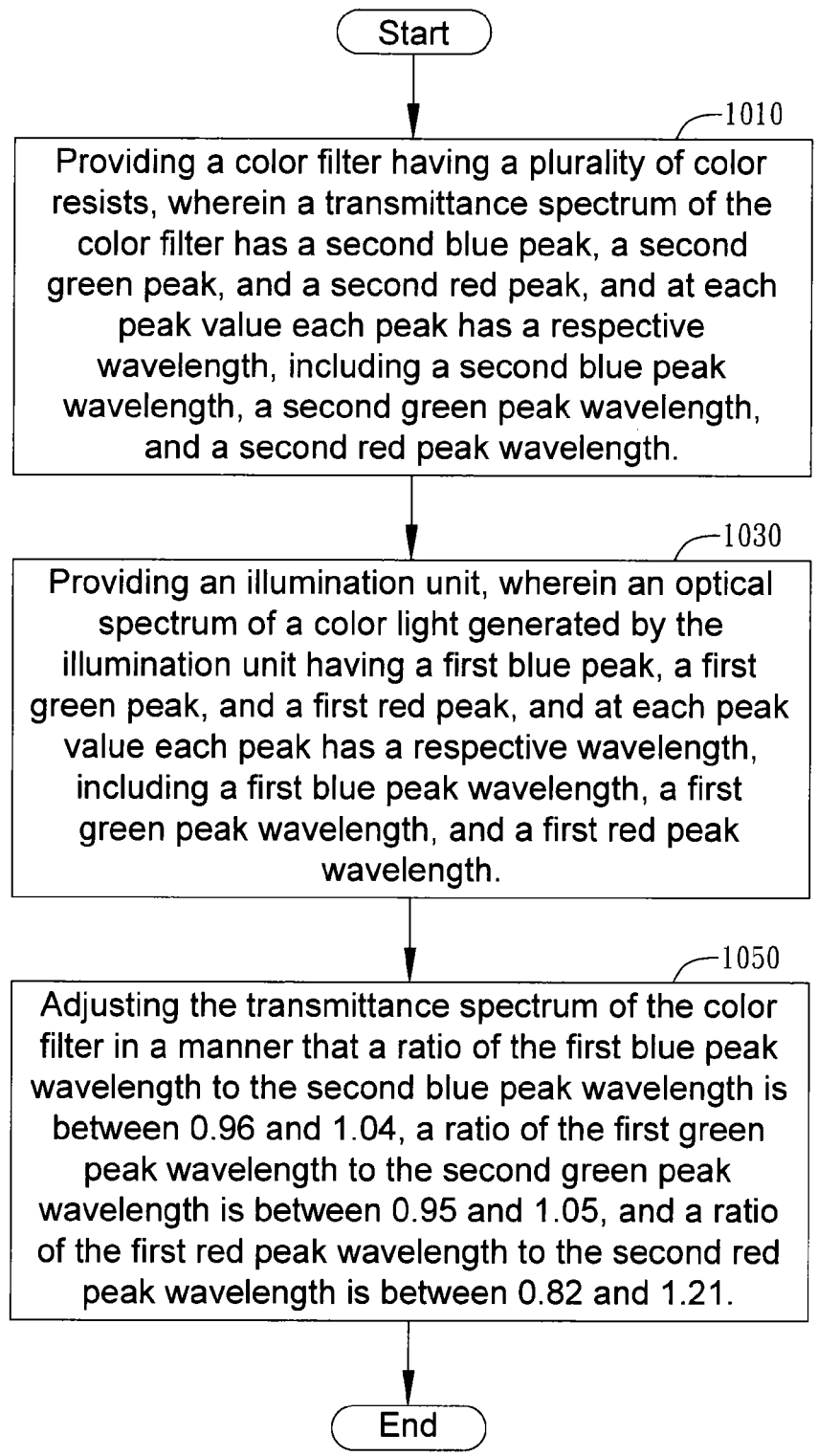
FIG. 7 and FIG. 8 are flow charts of the embodiments of the manufacturing method of the present invention.

The present invention also includes a manufacturing method of the display device. As FIG. 7 shows, a step 1010 includes providing a color filter which includes a plurality of color resists. As the embodiment above, a transmittance spectrum of the color filter has a second blue peak, a second green peak, and a second red peak. At each peak value each peak has a respective wavelength, including a second blue peak wavelength, a second green peak wavelength, and a second red peak wavelength.

A step 1030 includes providing an illumination unit which includes a light-emitting chip and a plurality of quantum dot phosphors. The light-emitting chip emits light to excite the quantum dot phosphors to generate a color light. The color light has an optical spectrum having a first blue peak, a first green peak, and a first red peak. At each peak value, each peak has a respective wavelength, including a first blue peak wavelength, a first green peak wavelength, and a first red peak wavelength. In a preferred embodiment, the quantum dot phosphors are disposed within a sealant covering the light-emitting chip in a manner of remote phosphor, and separated with the light-emitting chip by a proper interval. However, in other embodiments, the quantum dot phosphors can be disposed within the sealant in the manner of uniform distribution or conformal distribution. Besides, in a preferred embodiment, a material of the quantum dot phosphor is selected from at least one of the following: ZnS, ZnO, GaN, ZnSe, CdS, ZnTe, GaSe, CdSe, CdTe, GaAs, InP, GaSb, InAs, Te, PbS, InSb, PbTe, or PbSe.

A step 1050 includes adjusting the transmittance spectrum of the color filter in a manner that a ratio of the first blue peak wavelength to the second blue peak wavelength is between 0.96 and 1.04, a ratio of the first green peak wavelength to the second green peak wavelength is between 0.95 and 1.05, and a ratio of the first red peak wavelength to the second red peak wavelength is between 0.82 and 1.21. In the present embodiment, the optical spectrum of the color light emitted from the light-emitting chip is adjusted at first and then the transmittance spectrum of the color filter is adjusted according to the optical spectrum. By design, the illumination efficiency and color saturation are elevated. In a preferred embodiment, the step 1050 of adjusting the ratios of wavelengths includes adjusting the thickness of the color resists of the color filter to change the transmittance spectrum of the color filter. Besides, adjusting the transmittance spectrum of the color filter includes adjusting the material of the color resists.

Figure 8:
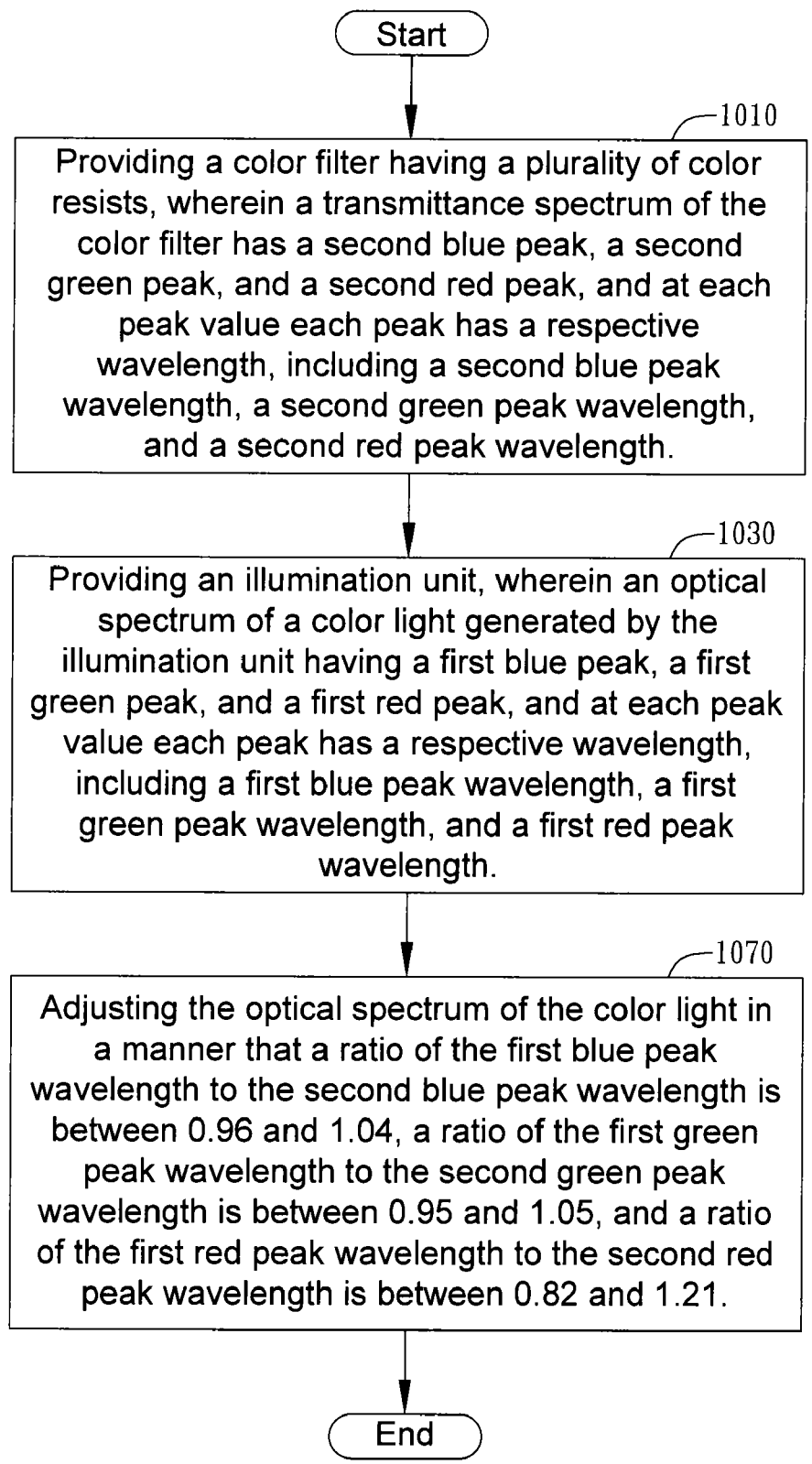

In another embodiment shown in FIG. 8, except for the same steps 1010 and 1030, it further includes step 1070: adjusting the optical spectrum of the color light in a manner that the ratio of the first blue peak wavelength to the second blue peak wavelength is between 0.96 and 1.04; the ratio of the first green peak wavelength to the second green peak wavelength is between 0.95 and 1.05; the ratio of the first red peak wavelength to the second red peak wavelength is between 0.82 and 1.21. In the present embodiment, the transmittance spectrum of the color filter is adjusted at first and then the optical spectrum of the light emitted from the light-emitting chip is adjusted according to the transmittance spectrum. By design, the illumination efficiency and color saturation are elevated.

In a preferred embodiment, step 1070 of adjusting the ratios of wavelengths includes adjusting a diameter or a material of the quantum dot phosphor to change the property and waveform of the transmittance spectrum, for example, restricting the diameter of the phosphor to be between 2.3 nm and 5.5 nm when the material of the phosphor is CdSe. Besides, a structure of the quantum dot phosphor can be selectively adjusted, for example, forming the structure of the quantum dot phosphor in a manner of a single core or a core covered by a layer. When the latter one is adopted, a material of the core should be decided at first, and then form the layer covering the core. The material of the core and the layer is selected from but is not restricted to ZnS, ZnO, GaN, ZnSe, CdS, ZnTe, GaSe, CdSe, CdTe, GaAs, InP, GaSb, InAs, Te, PbS, InSb, PbTe, or PbSe. In an embodiment, for example, a diameter of the core is restricted to be between 2.3 nm and 5.5 nm when the material of the core is CdSe; at the same time, when the material of the layer is ZnS, the thickness of the layer is restricted to be between 0.2 nm and 1.7 nm.

Although the preferred embodiments of present invention have been described herein, the above description is merely illustrative. The preferred embodiments disclosed will not limit the scope of the present invention. Further modifications of the invention herein disclosed will occur to those skilled in the respective arts and all such modifications are deemed to be within the scope of the invention as defined by the appended claims.

What is claimed is:

1. A display device, comprising:
an illumination unit having a light-emitting chip and a plurality of quantum dot phosphors, wherein the light-emitting chip emits light to excite the quantum dot phosphors to generate a color light, the color light has an optical spectrum having a first blue peak, a first green peak, and a first red peak, and at each peak value each peak has a respective wavelength, including a first blue peak wavelength, a first green peak wavelength, and a first red peak wavelength; and
a color filter, disposed in a light path of the illumination unit, for filtering the color light, wherein a transmittance spectrum of the color filter has a second blue peak, a second green peak, and a second red peak, and at each peak value each peak has a respective wavelength, including a second blue peak wavelength, a second green peak wavelength, and a second red peak wavelength;
wherein a ratio of the first blue peak wavelength to the second blue peak wavelength is between 0.96 and 1.04, a ratio of the first green peak wavelength to the second green peak wavelength is between 0.95 and 1.05, a ratio of the first red peak wavelength to the second red peak wavelength is between 0.82 and 1.21.

2. The display device of claim 1, wherein a ratio of a full width at half maximum of the first green peak to that of the second green peak is smaller than 0.45.

3. The display device of claim 1, wherein a ratio of a full width at half maximum of the first red peak to that of the second red peak is smaller than 0.25.

4. The display device of claim 1, wherein a full width at half maximum of the first blue peak, of the first green peak, and of the first red peak are smaller than 50 nm.

5. The display device of claim 1, wherein the first blue wavelength is between 440 nm and 457 nm, and the second blue wavelength is between 440 nm and 457 nm.

6. The display device of claim 1, wherein the first green wavelength is between 510 nm and 535 nm, and the second green wavelength is between 510 nm and 535 nm.

7. The display device of claim 1, wherein the first red wavelength is between 640 nm and 780 nm, and the second red wavelength is between 640 nm and 780 nm.

8. The display device of claim 1, wherein a material of the quantum dot phosphor is CdSe, and a diameter of the quantum dot phosphor is between 2.3 nm and 5.5 nm.

9. The display device of claim 1, wherein at least one of the quantum dot phosphors has a core and a layer covering the core.

10. The display device of claim 9, wherein a material of the core of the quantum dot phosphor is CdSe, a diameter of the core is between 2.3 nm and 5.5 nm, and a material of the layer of the quantum dot phosphor is ZnS, a thickness of the layer of the quantum dot phosphor is between 0.2 nm and 1.7 nm.

11. A manufacturing method of a display device, comprising:
providing a color filter having a plurality of color resists, wherein the transmittance spectrum of the color filter has a second blue peak, a second green peak, and a second red peak, and at each peak value each peak has a respective wavelength, including a second blue peak wavelength, a second green peak wavelength, and a second red peak wavelength;
providing an illumination unit having a light-emitting chip and a plurality of quantum dot phosphors, wherein the light-emitting chip emits light to excite the quantum dot phosphors to generate a color light, the color light has an optical spectrum having a first blue peak, a first green peak, and a first red peak, and at each peak value each peak has a respective wavelength, including a first blue peak wavelength, a first green peak wavelength, and a first red peak wavelength; and
adjusting the transmittance spectrum of the color filter in a manner that a ratio of the first blue peak wavelength to the second blue peak wavelength is between 0.96 and 1.04, a ratio of the first green peak wavelength to the second green peak wavelength is between 0.95 and 1.05, and a ratio of the first red peak wavelength to the second red peak wavelength is between 0.82 and 1.21.

12. The manufacturing method of claim 11, wherein the step of adjusting the transmittance spectrum of the color filter includes adjusting the thickness of the color resist.

13. The manufacturing method of claim 11, wherein the step of adjusting the transmittance spectrum of the color filter includes adjusting the material of the color resist.

14. A manufacturing method of a display device, comprising:
providing a color filter having a plurality of color resists, wherein the transmittance spectrum of the color filter has a second blue peak, a second green peak, and a second red peak, and at each peak value each peak has a respective wavelength, including a second blue peak wavelength, a second green peak wavelength, a second red peak wavelength;
providing an illumination unit having a light-emitting chip and a plurality of quantum dot phosphors, wherein the light-emitting chip emits light to excite the quantum dot phosphors to generate a color light, the color light has an optical spectrum having a first blue peak, a first green peak, and a first red peak, the first blue peak, and at each peak value each peak has a respective wavelength, including a first blue peak wavelength, a first green peak wavelength, and a first red peak wavelength; and
adjusting the optical spectrum of the color light in a manner that a ratio of the first blue peak wavelength to the second blue peak wavelength is between 0.96 and 1.04, a ratio of the first green peak wavelength to the second green peak wavelength is between 0.95 and 1.05, and a ratio of the first red peak wavelength to the second red peak wavelength is between 0.82 and 1.21.

15. The manufacturing method of claim 14, wherein the step of adjusting the optical spectrum of the color light includes adjusting a diameter of the quantum dot phosphor.

16. The manufacturing method of claim 14, wherein the step of adjusting the optical spectrum of the color light includes adjusting a material of the quantum dot phosphor.

17. The manufacturing method of claim 14, wherein the step of adjusting the optical spectrum of the color light includes:
forming a core; and
forming a layer covering the core to form one of the quantum dot phosphors.

18. A display device, comprising:
an illumination unit having a light-emitting chip and a plurality of quantum dot phosphors, wherein the light-emitting chip emits light to excite the quantum dot phosphors to generate a color light, the color light has an optical spectrum having a first blue peak, a first green peak, and a first red peak, and at each peak value each peak has a respective wavelength, including a first blue peak wavelength, a first green peak wavelength, and a first red peak wavelength; and
a color filter, disposed in a light path of the illumination unit, for filtering the color light, wherein a transmittance spectrum of the color filter has a second blue peak, a second green peak, and a second red peak, and at each peak value each peak has a respective wavelength, including a second blue peak wavelength, a second green peak wavelength, and a second red peak wavelength;
wherein the first blue peak wavelength, the first green peak wavelength, and the red peak wavelength respectively match with the second blue peak wavelength, the second green peak wavelength, and the second red peak wavelength.

19. The display device of claim 18, wherein a ratio of the first blue peak wavelength to the second blue peak wavelength is between 0.96 and 1.04.

20. The display device of claim 18, wherein a ratio of the first green peak wavelength to the second green peak wavelength is between 0.95 and 1.05.

21. The display device of claim 18, wherein a ratio of the first red peak wavelength to the second red peak wavelength is between 0.82 and 1.21.

* * * * *